US009369458B2

(12) United States Patent
McCallum (10) Patent No.: US 9,369,458 B2
(45) Date of Patent: Jun. 14, 2016

(54) WEB-CENTRIC AUTHENTICATION PROTOCOL

(71) Applicant: Red Hat, Inc., Raleigh, NC (US)

(72) Inventor: Nathaniel McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 199 days.

(21) Appl. No.: 13/898,394

(22) Filed: May 20, 2013

(65) Prior Publication Data

US 2013/0312079 A1 Nov. 21, 2013

Related U.S. Application Data

(60) Provisional application No. 61/648,923, filed on May 18, 2012.

(51) Int. Cl.
G06F 21/00 (2013.01)
H04L 29/06 (2006.01)
G06F 21/33 (2013.01)
G06F 21/30 (2013.01)

(52) U.S. Cl.
CPC ............ *H04L 63/0823* (2013.01); *G06F 21/30* (2013.01); *G06F 21/335* (2013.01)

(58) Field of Classification Search
CPC ........ G06F 21/30; G06F 21/33; G06F 21/335; G06F 21/31
See application file for complete search history.

(56) References Cited

U.S. PATENT DOCUMENTS

| 2009/0037729 A1* | 2/2009 | Smith ................... H04L 9/3234 713/158 |
| 2012/0084850 A1* | 4/2012 | Novak et al. ...................... 726/8 |
| 2013/0007868 A1* | 1/2013 | Hoggan et al. .................... 726/8 |

* cited by examiner

*Primary Examiner* — Edward Zee
(74) *Attorney, Agent, or Firm* — Lowenstein Sandler LLP (57) ABSTRACT

Systems and methods are disclosed for providing a Web-centric authentication protocol. In one implementation, a processing device receives a user request to access a protected resource and determines that a digital certificate for accessing the protected resource is not stored locally. A processing device requests a first digital certificate from an authentication service. A processing device receives the first certificate from the authentication service. A processing device receives a certificate request from the authentication service. A processing device provides the first digital certificate to the authentication service in response to the certificate request. A processing device receives a second digital certificate from the authentication service. A processing device accesses the protected resource using the second digital certificate.

14 Claims, 7 Drawing Sheets

WEB-CENTRIC AUTHENTICATION PROTOCOL

CROSS-REFERENCE TO RELATED APPLICATION

This application is related to and claims the benefit of U.S. Patent Application No. 61/648,923, filed May 18, 2012, the entirety of which is incorporated herein by reference.

TECHNICAL FIELD

Aspects and implementations of the present disclosure relate to data processing, and more specifically, to providing a Web-centric authentication protocol.

BACKGROUND

In various computing environments, authentication protocols can be used to authenticate users and/or grant or verify that users have access to particular resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

In various computing environments, authentication protocols can be used to authenticate users and/or grant or verify that users have access to particular resources (e.g., computers, servers, services, etc.). Currently, many existing authentication protocols are directed to enterprise desktop scenarios. In such scenarios, an organization can have full control over a desktop computer (or other such computing devices) which can have a static configuration and operate on known networks. One example authentication protocol used in an enterprise desktop scenario is the Kerberos protocol.

As portable computing devices such as laptop computers became more commonplace, authentication protocols were developed that were directed to caching credentials such that, as a client device (e.g., the laptop) switched between networks, authentication could take place in various scenarios. However many of these authentication protocols still rely on the assumption that an organization has full control over the client device (e.g., the laptop, the desktop, the smart phone, etc.).

Moreover, with the advent of mobile computing, many organizations contend with mobile devices (e.g., personal smartphones, personal laptops, etc.) that are purchased/maintained by users (and not by the organization). Such users may wish to utilize these devices to access organization resources even though the organization does not have full control over these devices. Additionally, the implementation of various cloud-based services can often require authentication beyond the firewalls of the organization. These challenges can be addressed by: 1) establishing and maintaining a second set of credentials for the other devices, 2) replicating corporate user accounts into a cloud service, and/or 3) deploying a federation solution. However, establishing/maintaining a second set of credentials can require users to manage yet another set of credentials, which may result in possible credential mismanagement (e.g., users may lose their credentials, may accidentally disclose their credentials, may have difficulties managing different sets of credentials, etc.). Moreover, replicating corporate user accounts into a cloud service usually entails placing security critical information in the hands of a third party (e.g., the party which provides the cloud server) over which the organization has no control over (and which may have security policy that is inconsistent with the security policy of the organization). Additionally, deploying a federation solution can entail the introduction of a costly new layer of software, increasing both TCO and technical complexity.

Many non-enterprise authentications are performed over the hypertext transfer protocol (HTTP) (e.g., authentications to grant users access to consumer web services). Although HTTP provides some authentication mechanisms, such mechanisms alone may be insecure. Additionally, many web services tend to eschew such authentication mechanisms in favor of web-form based login mechanisms. These web-form based login mechanisms may be prone to bugs and/or errors due to lack of standard, reusable implementations.

Accordingly, described herein are various example architectures that provide a Web-centric (e.g., network-centric or Internet-centric) authentication protocol. In one implementation, such an authentication protocol can be used to authenticate users to services via a trusted third party. In another implementation, the authentication protocol can be a widely deployable authentication protocol and can be suited to both web and enterprise usage. In a further implementation, the Web-centric authentication protocol can provide a decentralized, enterprise-grade authentication protocol suited for deployment in existing HTTP stacks.

In one implementation, the referenced Web-centric authentication protocol can enable authentication of multiple devices (e.g., a user's smart phone and the user's laptop) from a variety of different locations (e.g., from a corporate location and/or from the user's home). In another implementation the Web-centric authentication protocol can also utilize and/or support multi-factor authentication (e.g., two factor authentication using a password and a one-time password (OTP)). In other implementations, the Web-centric authentication protocol can reduce and/or minimize the amount or number of changes to be made to existing server architectures.

In one implementation, the Web-centric authentication protocol can be employed across different domains, networks, and/or infrastructures (e.g., used across the web/internet, different clouds, or different private infrastructures/networks). In another implementation, the Web-centric authentication protocol can be employed in conjunction with various communication protocols (e.g., any protocol which uses transport layer security (TLS) or Secure Socket Layer (SSL)). In a further implementation, the Web-centric authentication protocol can enable the use of stateless, horizontally-scalable authentication servers. In yet another implementation, the Web-centric authentication protocol can provide a single sign-on (SSO) experience.

Many web servers, browsers, etc., utilize authentication protocols such as X.509 standard certificate authentication (i.e., an enterprise authentication protocol). Such authentication protocols can operate at the SSL/TLS level, whereby encryption can be guaranteed, and a previously deployed system of hierarchical trust (e.g., certificate authorities (CAs), etc.) can be reused. However, such X.509 certificate authentication methods do not provide an efficient way to distribute these certificates, resulting in a poor user experience.

Accordingly, in one implementation, the Web-centric authentication protocol can provide an efficient way to distribute X.509 certificates (such as in an automated fashion) that can be used to authenticate users. In other implementations, the Web-centric authentication protocol can provide a certificate management system that can generate and/or grant short term certificates, such as in an automated fashion.

As described herein, in certain implementations various aspects of the Web-centric authentication protocol can include a protected resource (PR). Such a protected resource can, for example, be a network service and/or location that can be made available over a TLS encrypted channel upon providing a certificate trusted by the client, and/or that uses a client certificate, such as a client certificate signed by an authentication service certificate (ASC). In various implementations, because an authentication service certificate may be a certificate authority (CA) certificate with one or more additional distinguished name (DN) attributes, existing TLS encrypted services can be utilized. For example, in the case of Apache, the Web-centric authentication protocol can be configured by adding the authentication service certificate to the list of accepted client certificate CAs.

Moreover, as described herein, in certain implementations various aspects of the Web-centric authentication protocol can include an authentication certificate signing request (ACSR). In certain implementations, the referenced ACSR can be, for example, a public-key cryptography standards (PKCS) #10 Certificate Signing Request which can be submitted to an authentication service (AS) such as in order to obtain an authentication certificate (AC). The ACSR can contain a WebResourceCertificate X.509v3 extension, which can contain a copy of the certificate used to encrypt the TLS channel to which the authentication certificate can be delivered. The extra X.509v3 extension can permit the authentication service to verify that the protected resource is trusted.

Additionally, as described herein, in certain implementations various aspects of the Web-centric authentication protocol can include an authentication service (AS). Such an authentication service can be, for example, an HTTP-based service/certificate authority which can sign certificate requests, such as based upon a successful authentication. The AS can accept as input, for example, an Authenticated HTTP POST to an authentication service URL contained in an authentication certificate signing request (e.g., the URL to which an ACSR can be transmitted to using an HTTP POST request over a TLS encrypted channel). In reply to this HTTP POST, the Authentication Server can respond with an authentication certificate (AC) (e.g., an X.509 certificate that may be obtained from the AS for a particular protected resource) signed by the authentication service certificate (ASC) (e.g., a X.509 CA certificate that can be used by the AS to sign authentication certificates). The ASC can be comparable to a normal CA certificate and can also include additional information such as: The Subject distinguished name (DN) can may contain the WebAttribute attribute, which can be the authentication service URL (e.g., the URL to which an ACSR can be transmitted to using an HTTP POST request over a TLS encrypted channel). Additionally, the Subject DN can contain the attribute WebAttributeIcon, which can be the authentication service Icon URL (e.g., a URL which can refer to the favorite icon (Favicon) (HTML 4.01, XHTML 1.0) of the AS).

In certain implementations, an AS can provide the referenced authentication service URL over TLS encryption using a certificate signed by the authentication service certificate. Before returning the authentication certificate to the client, the AS can verify the identity of the client, such as using standard HTTP authentication methods and/or an authentication certificate (or a combination of the two). In one implementation, an AS can prevent the generation of ACs without the use of an authentication certificate granting certificate (ACGC) (e.g., an authentication certificate that can be obtained from the AS that can enable further generation of ACs, such as without re-authentication). It should be noted that, in certain implementations, an AS can be configured to enable the renewal of an ACGC, such as via authentication of a previous ACGC. In a scenario where ACGC renewal is not permitted, the AS can return HTTP status code 403 ("Forbidden").

Moreover, in certain implementations, if the ACSR lacks the WebResourceCertificate X.509v3 extension, the AS may fail the request and respond with HTTP status code 400 ("Bad Request"). The AS can also verify the contents of WebResourceCertificate, such as in order to determine if the protected resource is a trusted third party. In one implementation, if the AS responds with a successful authentication certificate, this certificate may contain the WebResourceCertificate X.509v3 extension copied from the ACSR. Additionally, in certain implementations, when the WebResourceCertificate X.509v3 extension of the ACSR contains a certificate that is itself unknown but is signed by a CA certificate trusted by the AS and/or where the trusted signing certificate belongs to the same organization as the certificate itself, the AS can place the trusted CA certificate in the resulting AC's WebResourceCertificate X.509v3 extension. Such an exception can be referred to as a 'Node Exception' and can facilitate a situation where an organization uses a CA certificate to identify a particular service while the individual nodes which provide the service each have their own certificates.

Additionally, in one implementation, the AS can ignore the contents of the Subject field in the ACSR and can generate a certificate with a Subject based on internal user information.

In one implementation, the Web-centric authentication protocol may not use a WebAttribute attribute. Instead, the Web-centric authentication protocol may use a domain name which may be obtained from a user identification (ID). For example, a user ID may be a user's email address (e.g., 'joe@domain.com'). In one implementation, the client may obtain the domain name (e.g., 'domain.com') from the user ID. The client may access a Domain Name System (DNS) server/service to obtain the URL for the authentication service. For example, the client may access the DNS service/service to obtain a DNS TXT record associated with the domain name (e.g., a_WebCentricProtocol.domain.com TXT record). The DNS TXT record associated with the domain name may contain one or more URLs for one or more authentication services. The client may use the URL obtained from the DNS TXT record to access the authentication service.

In another implementation, the client can receive the authentication service URL from another source. For example, the user may provide the authentication service URL when the user attempts to access a PR. In another example, the PR may provide a list of authentication service URLs when the user attempts to access the URL. It should be understood that on other embodiments, the client may receive the authentication service URL using a variety of methods and/or techniques.

As described herein, in certain implementations various aspects of the Web-centric authentication protocol can include a client. In certain implementations, upon receiving a CertificateRequest message in the TLS handshake containing an authentication service certificate the client can check the AC cache for an existing, valid AC. It should be understood that for an AC to match it may: (a) not be expired, (b) be issued by an authentication service certificate specified in the CertificateRequest, and/or (c) contain a WebResourceCertificate X.509v3 extension that matches the protected resource's certificate and/or one of its CA certificates.

In another implementation, if an existing, valid AC is found, the client can provide this AC to the server without (e.g., without user interaction). In yet another implementation, if an existing, valid AC is not found, but an expired AC is found which otherwise matches, the client can attempt to re-acquire an AC from the same AS as the expired AC. In one implementation, if an existing ACGC is not found for the same AS, the client may attempt to acquire one, prompting the user if necessary. Additionally, in another implementation, if no matching AC is found, the client can prompt the user for which AS to use to complete authentication. In this prompt, the client can differentiate between authentication services which: (a) already have a valid ACGC (will permit SSO), (b) have an expired ACGC (will require re-authentication to a known service); and/or (c) do not have an ACGC (an unknown AS). Additionally, in certain implementations the client can provide a mechanism to log-out of a service. This mechanism can, for example, delete the specified AC from the cache.

In one example implementation, the referenced Web-centric authentication protocol can be implemented and/or modified in relation to a protected resource, an authentication service, and/or a client. For example, a TLS encrypted resource can be converted to a Web-centric authentication protocol protected resource. In doing so, the PR can enable client authentication and install the authentication service certificate as a client certificate CA. By way of illustration, in Apache this may be performed by placing the certificate file in the CA Certificate directory.

In another example implementation, an authentication service can be implemented and/or modified. For example, a TLS enabled web server (e.g., Apache), can perform the ACGC verification with relatively few configuration steps. The related information can be passed to a Common Gateway Interface (CGI), Python, Web Server Gateway Interface (WSGI) or similar script which can use the CSR to generate a certificate. The Web-centric authentication protocol can also provide support for the custom DistinguishedName (DN) attributes and the WebResourceCertificate X.509 extension. For example, such support (e.g., the custom DN attributes of the WebResourceCertificate X.509 extension) can be added to the bindings and/or the authentication service can be written in a variety of programming languages such as C, C++, JAVA, JavaScript, etc.

Additionally, in an example implementation, support for the Web-centric authentication protocol can be added to the client by patching and/or providing an add-on to a web browser such as Internet Explorer, Firefox, Chrome, etc.

Figure 1:
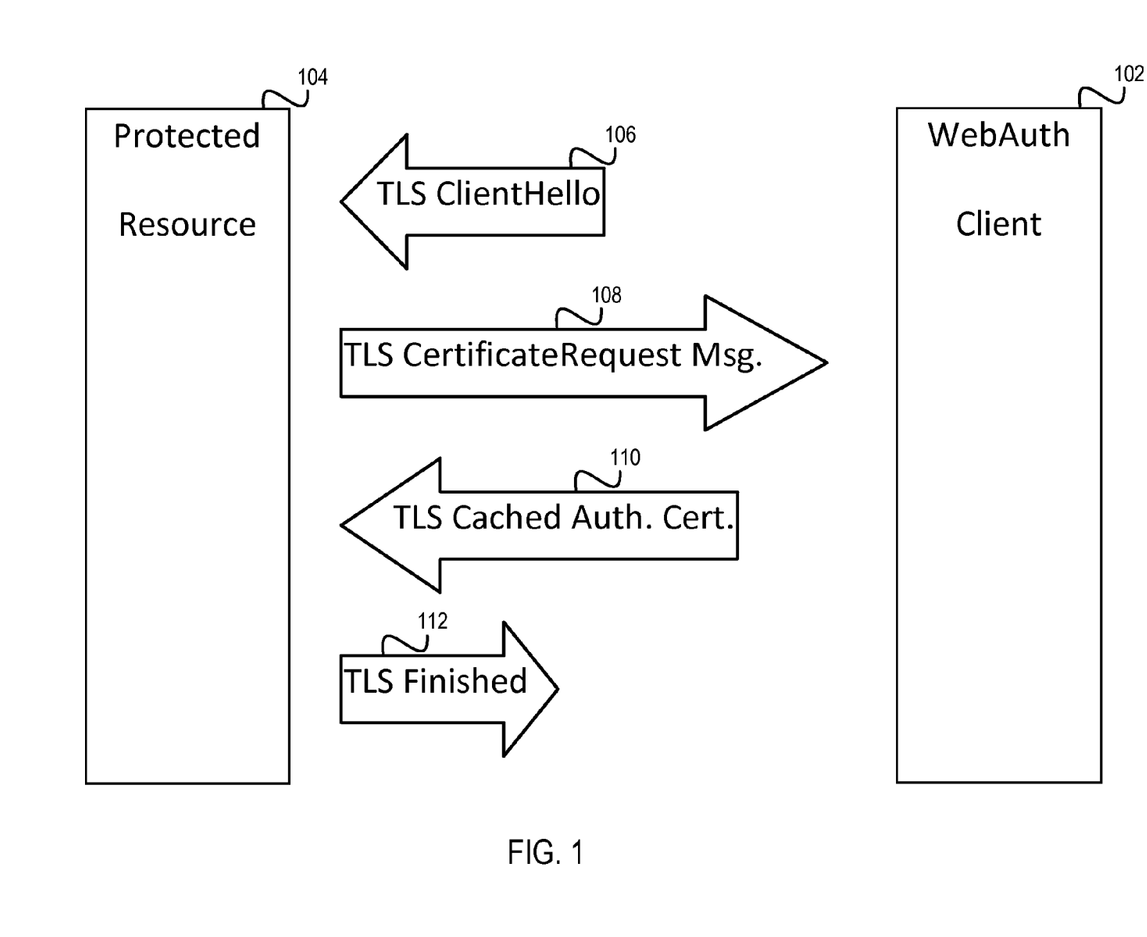
FIG. 1 depicts a schematic diagram depicting various aspects and operations of a Web-centric authentication protocol, in accordance with one implementation of the present disclosure.

FIG. 1 is a schematic diagram depicting various aspects and operations of a Web-centric authentication protocol according to certain implementations. For example, a client 102 can attempt to access a protected resource 104. It should be noted that, as referenced herein, a client, such as client 102 can be, for example a user device, user account/ID, etc. It should also be noted that, as referenced herein, a protected resource, such as protected resource 104 can be, for example a network service and/or location that can be made available (such as to client 102) upon providing a digital certificate (e.g., an X.509 certificate). At 106-108, during the TLS Handshake client 102 can receive a CertificateRequest message (e.g., a request for a certificate). Such a request can indicate that a certificate (e.g., an X.509 certificate) may be required from the client in order to complete the connection. The CertificateRequest message can contain, for example, the distinguished names of the certificate authorities that can be used to sign the client certificate. In one implementation, in a scenario where one of these distinguished names contains an attribute associated with the Web-centric authentication protocol (e.g., "WebAttribute"), the attribute can indicate that an authentication certificate can be obtained at a specified authentication service URL (as described herein, an authentication service can be, for example, an HTTP-based service/certificate authority which can sign certificate requests, such as based upon a successful authentication). At 110, if an authentication certificate (such as an existing and/or non-expired authentication certificate) is present in the client cache for protected resource 104, the referenced authentication certificate can be provided to the server, such as without user intervention, thus enabling authentication (112).

Figure 2:
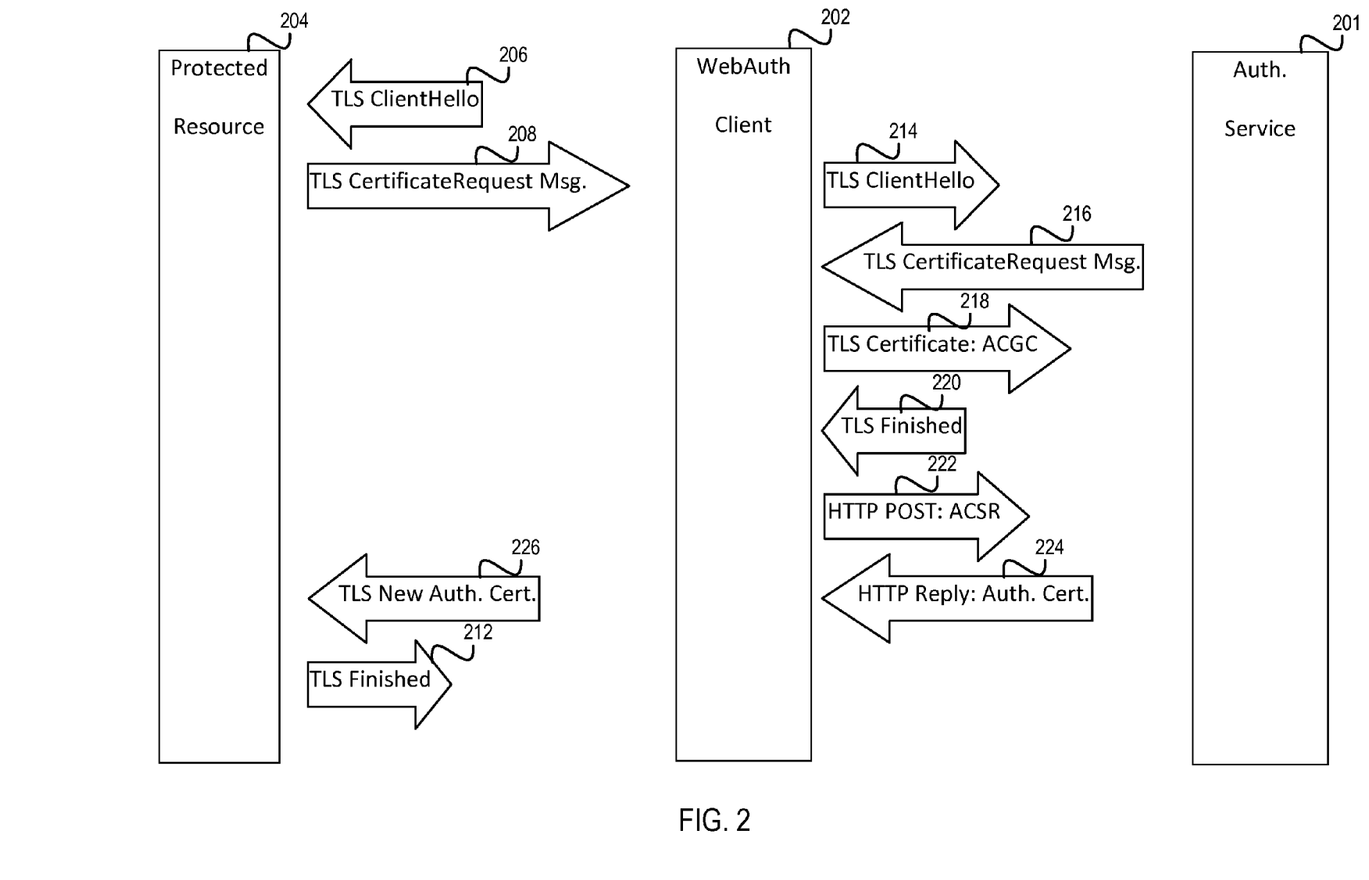
FIG. 2 depicts a schematic diagram depicting various aspects and operations of a Web-centric authentication protocol, in accordance with one implementation of the present disclosure.

FIG. 2 is a schematic diagram depicting various aspects and operations of a Web-centric authentication protocol according to certain implementations. For example, in a scenario where the user does not have an existing non-expired authentication certificate, the authentication service 201 can be contacted, such as in order to obtain an authentication certificate. It should be noted that, as referenced herein, an authentication service, such as authentication service 201, can be, for example, an HTTP-based service/certificate authority which can sign certificate requests, such as based upon a successful authentication. For example, at 214 a TLS Handshake can be initiated between the client 202 and the authentication service 201, and at 216 client 202 can receive a CertificateRequest message (e.g., a request for a certificate) from the authentication service 201. At 218 client 202 can then provide a digital certificate such as an authentication certificate granting certificate (ACGC) to the authentication service 201, thus completing the TLS Handshake (220). It should be noted that, in certain implementations, an ACGC can be a digital authentication certificate, such as an intermediate certificate, that can be obtained from the AS and/or that can enable further generation of ACs, such as without re-authentication. At 222, client 202 can prepare and/or generate an authentication certificate signing request (ACSR) and POST it to the URL of authentication service 201. It should be noted that, in certain implementations, the ACSR referenced herein can be, for example, a public-key cryptography standards (PKCS) #10 Certificate Signing Request which can be submitted to an authentication service (AS) such as in order to obtain an authentication certificate (AC). At 224, authentication service 201 can reply with an authentication certificate. At 226 the authentication certificate can be provided to the protected resource 204, thus enabling authentication (212). It should be noted that, in certain implementations, if the client 202 already possesses a non-expired authentication certificate granting certificate (ACGC) for the particular authentication service 201, the client can use the non-expired authentication certificate to obtain an authentication certificate for the protected resource 204.

Figure 3:
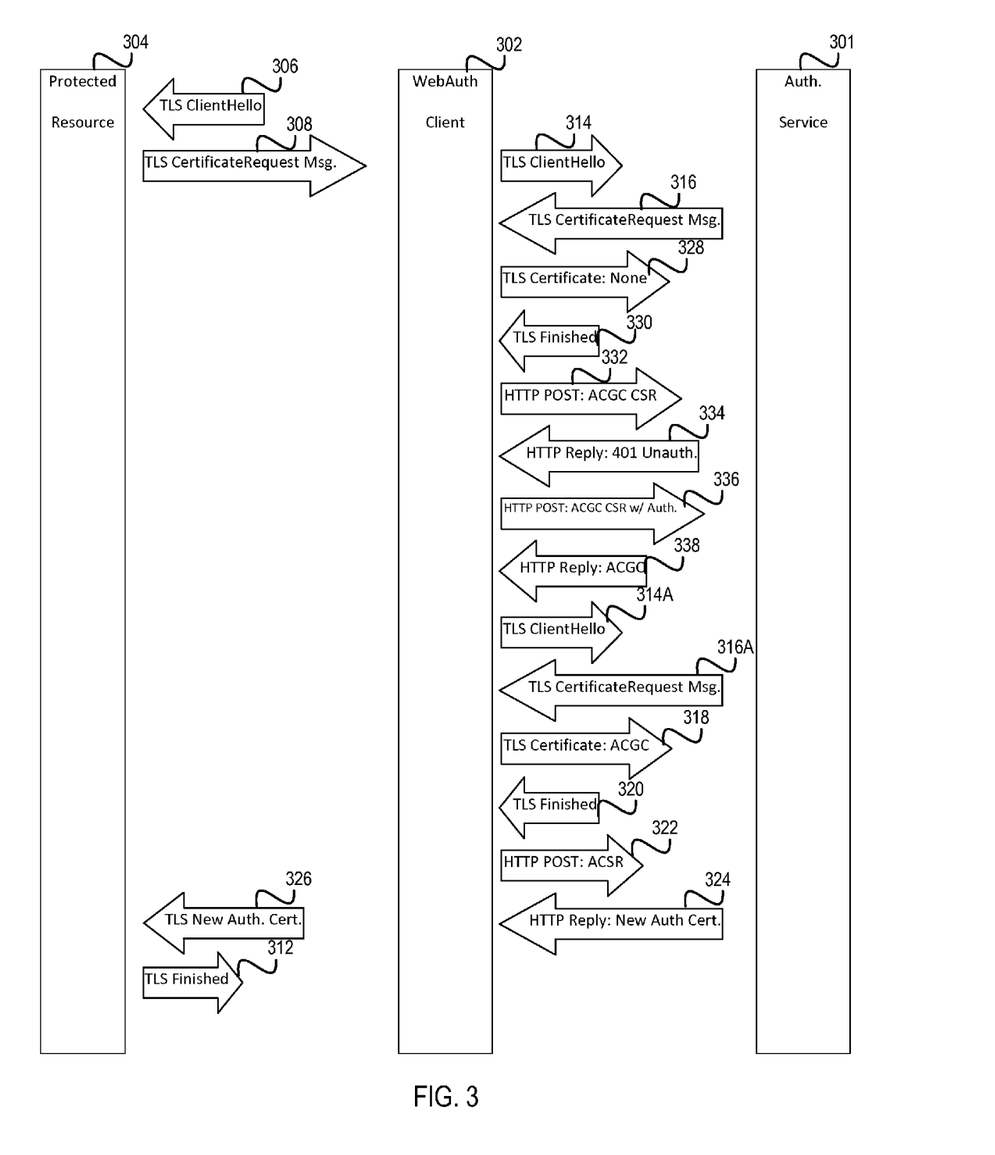
FIG. 3 depicts a schematic diagram depicting various aspects and operations of a Web-centric authentication protocol, in accordance with one implementation of the present disclosure.

FIG. 3 is a schematic diagram depicting various aspects and operations of a Web-centric authentication protocol according to certain implementations. For example, in a scenario where a client 302 does not possess a non-expired authentication certificate granting certificate (ACGC) for a particular authentication service 301, the authentication service 301 can be contacted (e.g., by client 302), such as in order to obtain an authentication certificate. For example, at 314 a TLS Handshake can be initiated between the client 302 and the authentication service 301, and at 316 client 302 can receive a CertificateRequest message (e.g., a request for a certificate) from the authentication service 301. In response, the client may not provide a certificate when prompted (328) (e.g., in a scenario where a client 302 does not possess such a certificate), thus completing the TLS handshake at 330). The client can provide an ACGC certificate signing request (CSR) to authentication service 301 (332), which, while initially being unauthorized (334) can be authorized such as through the use of one or more HTTP authorization methods (336). At 338, authorization service 301 can provide the ACGC to the client 302. Having received or otherwise obtained the ACGC, at 314A a TLS Handshake can be initiated between the client 302 and the authentication service 301, and at 316A client 302 can receive a CertificateRequest message (e.g., a request for a certificate) from the authentication service 301. At 318 client 302 can then provide an authentication certificate granting certificate (ACGC) to the authentication service 301, thus completing the TLS Handshake (320). At 322, client 302 can prepare and/or generate an authentication certificate signing request (ACSR) and POST it to the URL of authentication service 301. At 324, authentication service 301 can reply with an authentication certificate. At 326 the authentication certificate can be provided (e.g., by client 302) to the protected resource 304, thus enabling authentication (312). It should be noted that, in certain implementations, because obtaining an ACGC can be performed using standard HTTP authentication, various HTTP methods can be employed, including but not limited to: HTTP Basic Authentication, HTTP Digest Authentication, Kerberos, Simple and Protected GSSAPI Negotiation Mechanism (SPNEGO), etc.

Figure 4:
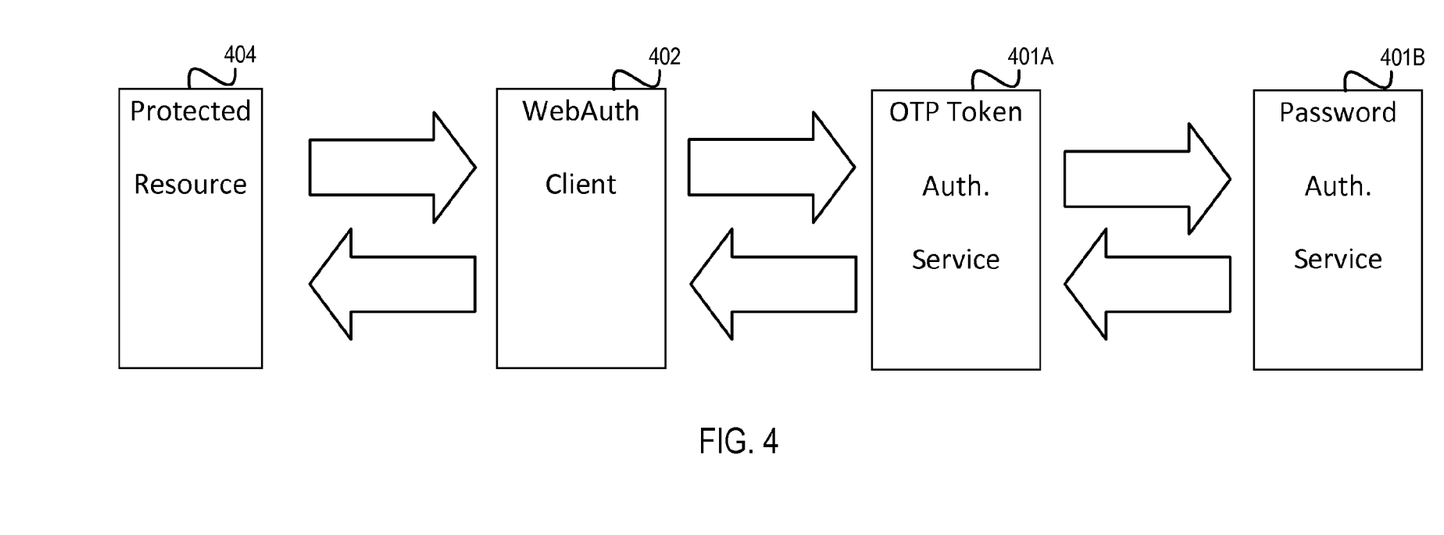
FIG. 4 depicts a schematic diagram depicting various aspects and operations of a Web-centric authentication protocol, in accordance with one implementation of the present disclosure.

FIG. 4 is a schematic diagram depicting various aspects and operations of a Web-centric authentication protocol according to certain implementations. For example, in various scenarios multiple factors of authentication (e.g., 2-factor authentication, 3-factor authentication, etc.) can be implemented, such as by chaining authentication services. As shown in FIG. 4, the protected resource 404 can require an authentication certificate from an authentication service which verifies an OTP token 401A and an authentication certificate from a second authentication service which verifies passwords 401B. By utilizing such a chaining method, different protected resources can request different levels of assurance and/or authentication. Moreover, in certain implementations, using and/or upgrading to a higher level of authentication/assurance may not require a user to re-enter the credentials associated with a current assurance level.

Moreover, in certain implementations, being that the referenced Web-centric authentication protocol can use X.509 certificates, existing trust model(s) which is/are in place for X.509 certificates can be used.

In one implementation, the client can be configured to trust the protected resource and/or the authentication service via their root certificate key rings. For example, the protected resource's certificate can be signed by a trusted root certificate and the authentication service certificate can also be signed by a trusted root certificate. Such an arrangement can permit the use of self-signed certificates, such as in the case of an organization which has full control over the client's root certificate key ring. Moreover, such an arrangement can permit the same level of trust for uncontrolled clients via a trusted third-party certificate authority. In another implementation, if the authentication certificate is compromised, it can be revoked, such as via a standard certificate revocation list.

In certain implementations, the authentication service can be configured to trust the client, such as on the basis of the user's credentials (such as in the case of obtaining an ACGC), and/or on the basis of the ACGC (such as in the case of obtaining ACs). In various implementations, being that the client provides the protected resource's (PR's) certificate in the ACSR, the authentication service can validate the trust of the PR, such as via a trusted third-party certificate authority and/or via its own internal mechanisms (e.g., via an internal PR list or PR registration, a blacklist for known abusers, etc.).

Additionally, in certain implementations, the protected resource can be configured to trust the authentication service via a trusted signature on the authentication service certificate and/or via a private trust agreement. In doing so, trust can be achieved for the authenticated entity (e.g., a user) via its established trust in the authentication service certificate.

In one implementation, the Web-centric authentication protocol can be configured such that limited liability can result in the event of a security compromise. An example of such a security compromise can be a single account compromise whereby a compromised set of credentials is utilized against an uncompromised authentication service. In one implementation, such a security compromise can be prevented by using network segmentation and providing the authentication service on a trusted network (being that the protected resource may not require direct connectivity to the authentication service). In another implementation, multi-factor authentication can be deployed, such as in order to prevent compromised credentials from obtaining an appropriate ACGC.

In a scenario where a security compromise does occur (resulting, for example, in a data leak), the Web-centric authentication protocol can be configured to provide certificate revocation and expiry. In doing so, the ramifications of the leaked data can be mitigated (such as by limiting the exposure of the leaked data to a certain time window).

In another implementation, the Web-centric authentication protocol can be configured to alleviate or reduce the problem of phishing. For example, by moving various credential prompts out of band from the HTML rendering and into the browser (or other client) (thus providing, for example, a consistent login experience) and/or by using encryption based on trusted ASCs, the opportunity to 'trick' a user into entering their credentials into an un-trusted web page is diminished and may.

In one implementation, the Web-centric authentication protocol can use an extension to the ACSR/AC, such as in order to permit a third-party to proxy an ACSR, and its resulting AC, through the client. Doing so can permit the third-party to act as the user based on the approval of the user. This can allow the web-centric authentication protocol to be used for and/or in conjunction with authentication delegation. The third-party AC can also have an expiry, making third-party access temporally limited. Combined with transparent renewals, the user experience can be a single prompt to grant access to the third party for as long as the client continues to use the third-party's service. When the user stops using third-party service, the third-party's AC can expire, thus protecting the user's sensitive data. It should be noted that such operations can occur across a protocol protected by TLS (not just HTTP).

By way of illustration, the Web-centric authentication protocol can be implemented in conjunction with a website/service that provides data analysis tools for financial data to end users (e.g., Mint.com). Such a website/service can aggregate data from a user's bank accounts into a single database and can further allows the user to keep track of budgeting, spending, etc. By implementing the Web-centric authentication protocol, the end user can log into their bank's AS (e.g., using multi-factor authentication), and the website/service can request a third-party AC from the browser (e.g., which expires after three months). The user can be prompted to decide if the website/service should have access to the bank data and, if granted, a three month certificate can be issued by the AS to the website/service. Accordingly, it can be appreciated that no credentials (e.g., User IDs, passwords, etc.) would need to change hands between the user and the website/service. Further, the website/service can prompt the browser to request renewal of the certificate, which the browser can do transparently. To the user, the website/service can maintain updated data from each of the user's various accounts. If the user decides not to continue using the website/service, when the third-party AC expires, the website/service loses access to the user's bank data without manual user intervention. If the user decides to return to the website/service, the user can simply log back into the website/service, a renewal AC can be generated, and the website/service continues to work again.

The described Web-centric authentication protocol can prevent users from being confused by conflicting (and potentially malicious) user interfaces (UIs) and can enable various web services to access the data they require while also protecting users from potentially unbounded data sharing.

Figure 5A:
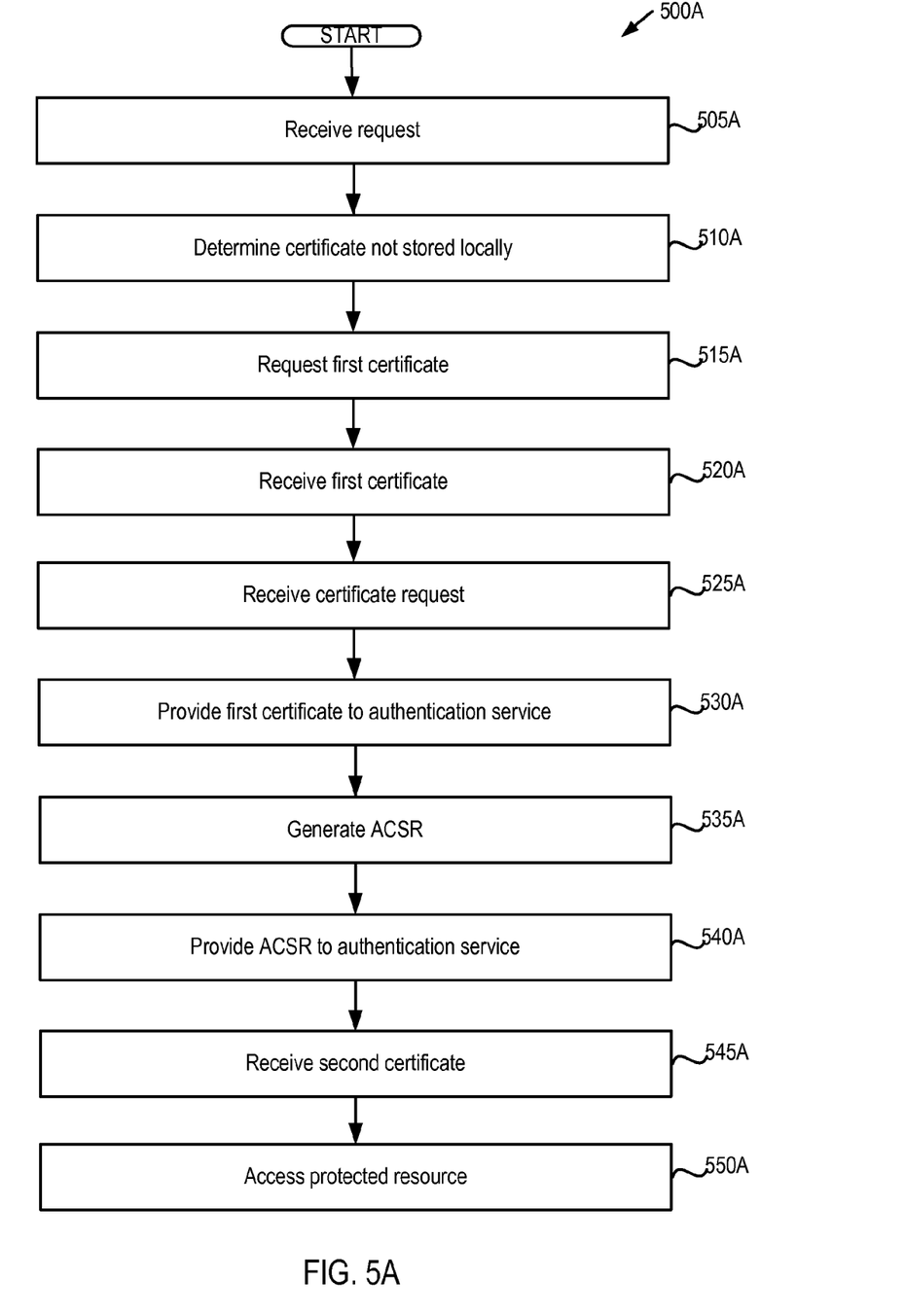
FIG. 5A depicts a flow diagram of aspects of a method for providing a Web-centric authentication protocol, in accordance with one implementation of the present disclosure.

FIG. 5A depicts a flow diagram of aspects of a method 500A for providing a Web-centric authentication protocol. The method is performed by processing logic that may comprise hardware (circuitry, dedicated logic, etc.), software (such as is run on a general purpose computer system or a dedicated machine), or a combination of both. In one implementation, the method is performed by one or more machines, such as a client, such as a client as depicted in FIGS. 1-4 and/or described herein.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

A request, such as a user request can be received (505A), such as by a client. In certain implementations, such a request can be a request to access a protected resource, such as is described herein. A determination can be made (e.g., by and/or in relation to the client) that a digital certificate for accessing the protected resource is not stored locally (e.g., at/in relation to the device) (510A). A request for a first digital certificate (e.g., an ACGC) can be made to authentication service (515A), such as by the client. A first digital certificate can be received (520A), such as by the client. In certain implementations, such a certificate can be provided by and/or received from an authentication service, such as is described herein. Moreover, in certain implementations the referenced first digital certificate can be and/or include an authentication certificate granting certificate (ACGC). A certificate request can be received (e.g., by the client), such as from the authentication service (525A). The first digital certificate can be provided to the authentication service (e.g., by the client), such as in response to the certificate request (530A). In certain implementations, an authentication certificate signing request (ACSR) can be generated (535A), and such an ACSR can be provided (e.g., by the client) to the authentication service (540A), such as is described herein. A second digital certificate can be received (545A). In certain implementations, such a second certificate can be received by the client from the authentication service, such as is described herein. Additionally, in certain implementations the second certificate can be and/or include an authentication certificate. Moreover, in certain implementations the second certificate can be generated based on the first certificate (such as the certificate received at 520A). Additionally, in certain implementations the referenced second certificate can be generated in view of the ACSR (such as the ACSR generated at 535A). The protected resource can be accessed (550A). In certain implementations, the protected resource can be accessed, such as by the client, using the second certificate, such as is described herein. Moreover, in certain implementations the second certificate can be provided to the protected resource (e.g., by the client).

Figure 5B:
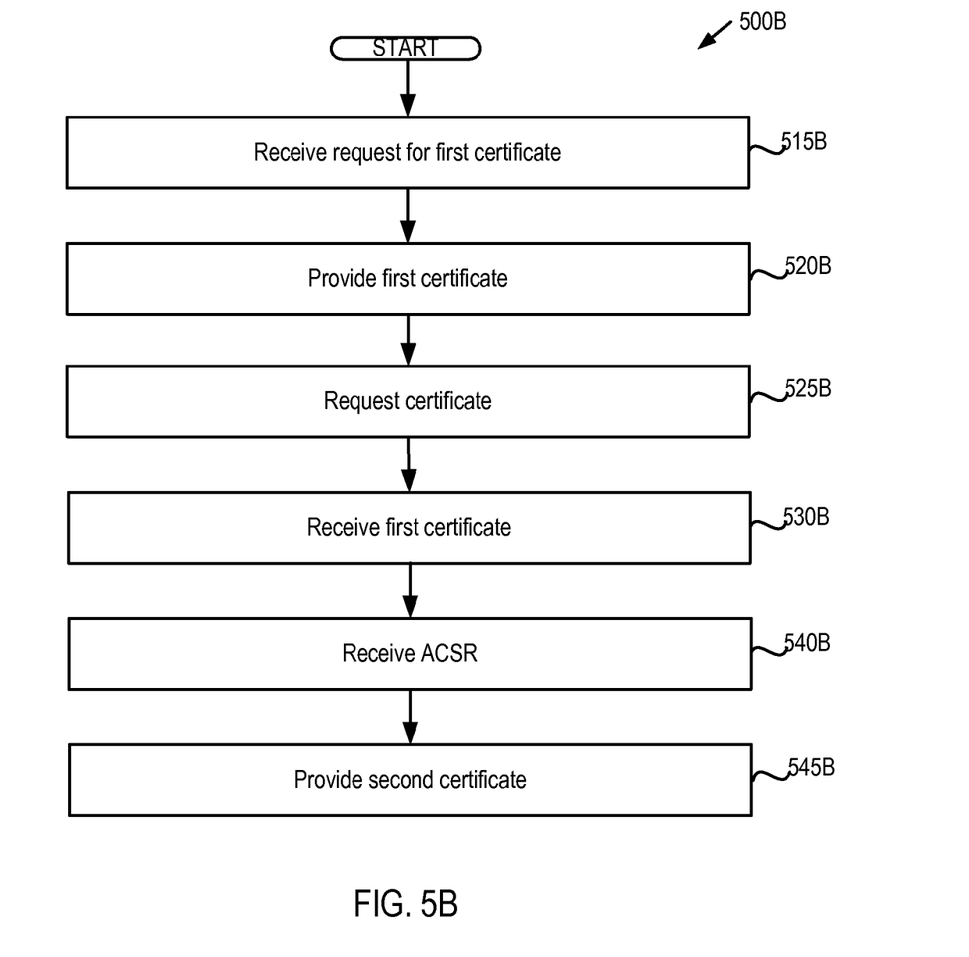
FIG. 5B depicts a flow diagram of aspects of a method for providing a Web-centric authentication protocol, in accordance with one implementation of the present disclosure.

FIG. 5B depicts a flow diagram of aspects of a method 500B for providing a Web-centric authentication protocol. The method is performed by processing logic that may comprise hardware (circuitry, dedicated logic, etc.), software (such as is run on a general purpose computer system or a dedicated machine), or a combination of both. In one implementation, the method is performed by one or more machines, such as an authorization service, such as an authorization service as depicted in FIGS. 1-4 and/or described herein.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

A request for a first digital certificate (e.g., an ACGC) can be received (e.g., from a client), such as by an authentication service (515B). A first digital certificate can be generated and/or provided (520B) to the client, such as by the authentication service, such as is described herein. Moreover, in certain implementations the referenced first digital certificate can be and/or include an authentication certificate granting certificate (ACGC). A certificate request can be made (e.g., from the client), such as by the authentication service (525B). The first digital certificate can be received (e.g., from the client) by the authentication service, such as in response to the certificate request (530B). In certain implementations, an authentication certificate signing request (ACSR) can be received (e.g., from the client) by the authentication service (540B), such as is described herein. A second digital certificate can be generated and/or provided (e.g., to the client) by the authentication service (545B), such as is described herein. Additionally, in certain implementations the second certificate can be and/or include an authentication certificate. Moreover, in certain implementations the second certificate can be generated based on the first certificate (such as the certificate provided at 520B). Additionally, in certain implementations the referenced second certificate can be generated/provided in view of/based on the ACSR (such as the ACSR received at 540B). Such a second certificate can enable the client to access a protected resource, such as is described herein.

Figure 6:
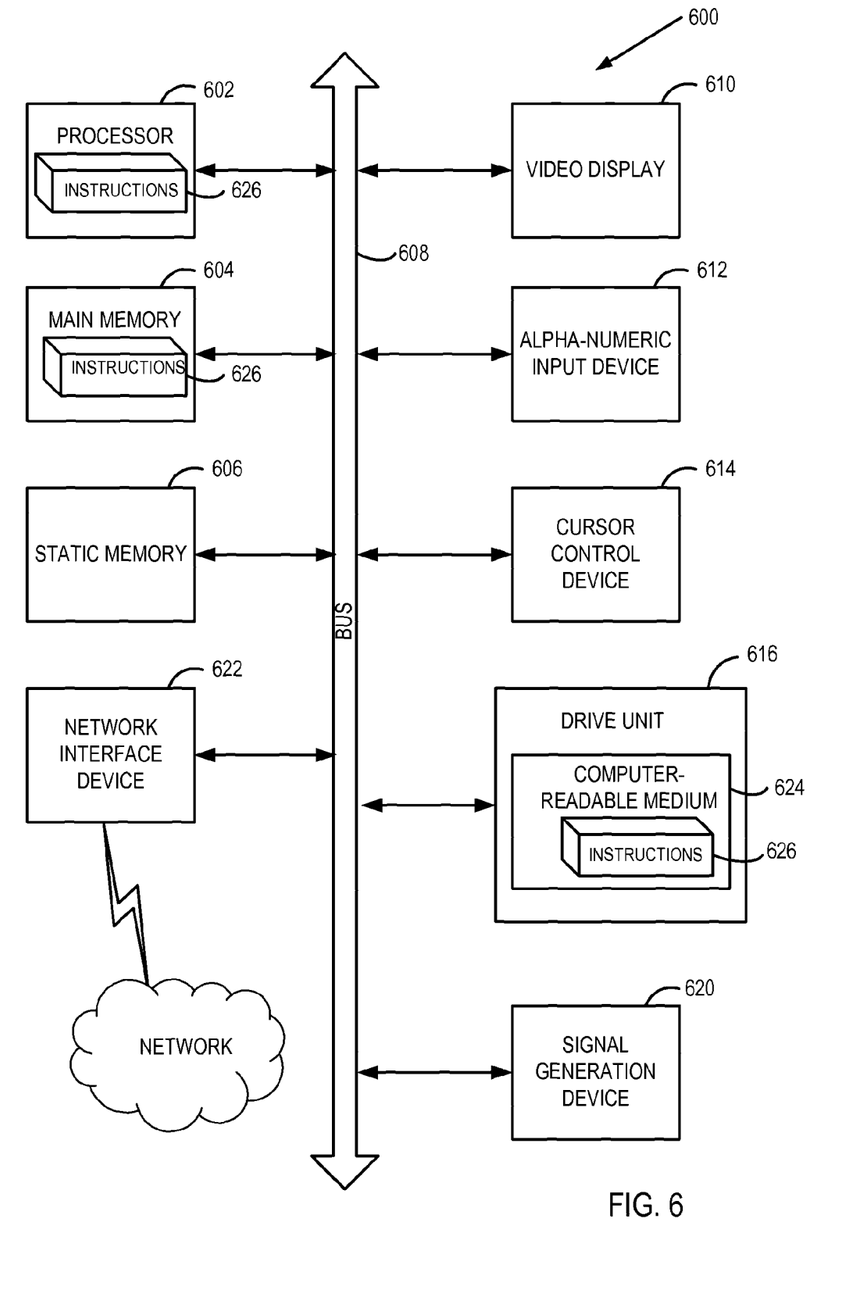
FIG. 6 depicts a block diagram of an illustrative computer system operating in accordance with aspects and implementations of the present disclosure.

FIG. 6 illustrates a diagrammatic representation of a computing system (e.g., a computing device) 600, within which a set of instructions, for causing the machine to perform any one or more of the methodologies discussed herein, may be executed. For example, one or more of the PR, the client, and the authentication service may executing or reside one or more computing systems 600. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions 626) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable media. The instructions 626 may further be transmitted or received over a network 621 via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting," "receiving," "obtaining," "determining," "authenticating," "generating," "checking," "providing," "granting," "updating," "storing," "creating," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving a request to access a protected resource;
    determining that a digital certificate to access the protected resource is not stored locally;
    requesting, by a processing device, a first digital certificate from an authentication service;
    receiving the first digital certificate from the authentication service;
    receiving a certificate request from the authentication service;
    providing the first digital certificate to the authentication service in response to the certificate request;
    receiving, by the processing device, a second digital certificate from the authentication service, the second digital certificate comprising an authentication certificate generated in view of the first digital certificate and an authentication certificate signing request (ACSR); and
    in response to a determination that a client associated with the request to access the protected resource is utilizing a service other than the authentication service, initiating access to the protected resource using the second digital certificate.

2. The method of claim 1, wherein the first digital certificate comprises an authentication certificate granting certificate (ACGC).

3. The method of claim 1, further comprising generating the ACSR.

4. The method of claim 1, wherein initiating access to the protected resource comprises providing the second digital certificate to the protected resource.

5. The method of claim 1, further comprising providing the ACSR to the authentication service.

6. A non-transitory computer readable storage medium comprising instructions that, when executed by a processing device, cause the processing device to:
    receive a request to access a protected resource;
    determine that a digital certificate to access the protected resource is not stored locally;
    request a first digital certificate from an authentication service;
    receive the first digital certificate from the authentication service;
    receive a certificate request from the authentication service;
    provide the first digital certificate to the authentication service in response to the certificate request;
    receive, by the processing device, a second digital certificate from the authentication service, the second digital certificate comprising an authentication certificate generated in view of the first digital certificate and an authentication certificate signing request (ACSR); and
    in response to a determination that a client associated with the request to access the protected resource utilizes a service other than the authentication service, initiate access to the protected resource using the second digital certificate.

7. The computer readable storage medium of claim 6, wherein the first digital certificate comprises an authentication certificate granting certificate (ACGC).

8. The computer readable storage medium of claim 6, wherein the processing device is further to generate the ACSR.

9. The computer readable storage medium of claim 6, wherein to initiate access to the protected resource the processing device is further to provide the second digital certificate to the protected resource.

10. The computer readable storage medium of claim 6, wherein the processing device is further to provide the ACSR to the authentication service.

11. A computing apparatus comprising:
    a memory; and
    a processing device, operatively coupled to the memory, the processing device to:
        receive a request from a client for a first digital certificate;
        provide the first digital certificate to the client;
        provide a certificate request to the client;
        receive the first digital certificate from the client in response to the certificate request; and
        in response to a determination that the client utilizes a service other than an authentication service, provide a second digital certificate to the client, the second digital certificate comprising an authentication certificate generated in view of the first digital certificate and an authentication certificate signing request (ACSR).

12. The computing apparatus of claim 11, wherein the first digital certificate comprises an authentication certificate granting certificate (ACGC).

13. The computing apparatus of claim 11, wherein the processing device is further configured to receive the ACSR.

14. The computing apparatus of claim 11, wherein the second certificate enables the client to access the protected resource.

* * * * *